United States Patent
Ludanek et al.

[11] Patent Number: 5,884,528
[45] Date of Patent: Mar. 23, 1999

[54] DRIVE GEAR SELECTION ARRANGEMENT FOR AN AUTOMATIC TRANSMISSION

[75] Inventors: Harald Ludanek; Christian Bartsch, both of Calberlah; Friedrich Stock, Wolfsburg, all of Germany

[73] Assignee: Volkswagen AG, Wolfsburg, Germany

[21] Appl. No.: 806,452

[22] Filed: Feb. 26, 1997

[30] Foreign Application Priority Data

Mar. 1, 1996 [DE] Germany .................. 196 08 020.7

[51] Int. Cl.$^6$ ............................ B60K 20/02; F16H 59/08
[52] U.S. Cl. .................. 74/473.3; 74/473.18; 116/28.1; 200/61.88
[58] Field of Search ............................ 74/473.3, 473.31, 74/473.18, 473.12, DIG. 7; 116/28.1; 200/61.88

[56] References Cited

U.S. PATENT DOCUMENTS

| | | | |
|---|---|---|---|
| 3,766,793 | 10/1973 | Knop | 74/335 |
| 4,199,747 | 4/1980 | Miller et al. | 200/61.88 X |
| 4,905,530 | 3/1990 | Stehle et al. | 74/335 |
| 5,094,115 | 3/1992 | Michihira et al. | 74/335 |
| 5,161,422 | 11/1992 | Suman et al. | 74/335 |
| 5,561,416 | 10/1996 | Marshall et al. | 200/61.88 X |
| 5,680,307 | 10/1997 | Issa et al. | 74/473.18 X |

FOREIGN PATENT DOCUMENTS

| | | |
|---|---|---|
| 0096352 | 12/1983 | European Pat. Off. . |
| 3103033 | 8/1982 | Germany . |
| 3941665 | 6/1991 | Germany . |
| 2285841 | 7/1995 | United Kingdom . |

OTHER PUBLICATIONS

"Porsche–Tiptronic noch sportlicher" Automobil Revue.

*Primary Examiner*—Charles A. Marmor
*Assistant Examiner*—Troy Grabow
*Attorney, Agent, or Firm*—Baker & Botts, L. L. P.

[57] ABSTRACT

A space and weight-saving drive gear selection arrangement for an automatic transmission is configured clearly for the driver, is simple to install and can be operated without a significant application of mechanical force. For this purpose, the drive gear selection has a knob which is positioned centrally in a circular or elliptical display panel. The display panel has a first section with the selection positions for the drive conditions P, R, N and D which can be selected by the knob. Arranged in a second portion of the display panel is an information panel in which operating instructions for the driver or information regarding the operating state of the transmission can be displayed.

6 Claims, 2 Drawing Sheets

DRIVE GEAR SELECTION ARRANGEMENT FOR AN AUTOMATIC TRANSMISSION

BACKGROUND OF THE INVENTION

This invention relates to multifunctional drive gear selection arrangement for automatic transmissions.

Conventional drive gear selection arrangements signal the gear desired by the driver of a motor vehicle to a transmission control unit which selects the desired gear in the transmission by driving electrohydraulically actuatable control valves. Typically, drive gear selectors of this kind are designed as a selector lever which can be moved angularly in a gear selection slot so that one of several gear selection positions, for example, P, R, N, D1, D2 and D3 can be selected mechanically.

U.S. Pat. No. 4,905,530, for example, discloses a gear selection arrangement for an automatic transmission which can be controlled by an electronic control unit in which a manually operated gear selection lever can be moved to select one of the above-mentioned gears by moving the selector lever angularly in a first gear selection slot. The selector lever may also be switched through a transverse slot into a second gear selection slot in which the selector lever can be moved angularly by the driver to manually select a desired forward gear, for example, D1, D2 or D3.

The magazine, *Automobil Revue* No. 29 (14th Jul., 1994), page 19, describes a gear selection arrangement for an automatic transmission of a motor vehicle in which rocker switches are arranged on the spokes of the vehicle steering wheel by which it is possible to shift up or down in the forward-gear range of the transmission.

Finally, U.S. Pat. No. 5,094,115 discloses a gear selection arrangement for automatic transmissions in which a drive gear switch is arranged on the steering column in the immediate vicinity of the steering wheel. This drive gear switch is an essentially cylindrical rotary switch having a finger actuation surface projecting perpendicularly from its cylinder circumference which can be depressed to select a transmission drive gear. Pushbuttons are arranged on the finger actuation surface for the activation and deactivation of different transmission operating modes. A section of a hollow cylinder arranged for rotation about the axis of the cylindrical drive gear switch and spaced from the cylindrical drive-gear switch displays the selected gear.

SUMMARY OF THE INVENTION

Accordingly, it is an object of the present invention to provide a drive gear selection arrangement which overcomes disadvantages of the prior art.

Another object of the invention is to provide a space and weight-saving drive gear selection arrangement which can be operated easily and without substantial mechanical effort by the driver.

A further object of the invention is to provide a drive gear selection arrangement in which the selected transmission condition or the selected drive gear is clearly displayed to the driver of the vehicle so that the driver can read important information from the device.

These and other objects of the invention are attained by providing a drive gear selection arrangement which transmits mechanical or electrical signals to a transmission control unit. The drive gear selection device preferably includes an essentially circular or elliptical display panel in which a knob for selecting individual drive gear selection positions, such as P, R, N, D1, D2 and D3, has a centrally positioned axis and is connected to a transmission control unit through an electrical or mechanical signal generation or transmission system which may include, for example, electric switches or Bowden cables. In the display panel, the selection positions of the drive gears of the transmission are arranged in an upper circular or elliptical portion, while a selectively activatable information panel is positioned in a lower portion to indicate to the driver when a forward gear D1–D3 or the reverse gear R is chosen or that the brake of the motor vehicle must be actuated before the desired gear can be engaged. However, it is also possible to use the selectively activatable information panel to display other transmission-relevant information to the driver, for example the activation of a sporty or economy gear change program. To attract the attention of the driver more effectively, provision can be made for the entire display panel or just the letters or the display symbols to flash on and off.

In an advantageous embodiment of the invention, a momentary contact switch can be arranged on the knob by which the forward gears D1–D3 can be selected in a rising or falling sequence. This momentary contact switch is preferably in the form of a tipswitch. In this embodiment of the drive gear selection device only a selection position D is provided as forward drive indication on the first display panel for the drive gears of the transmission, and a further display panel is arranged next to the D selection position. The forward gears chosen by the momentary contact switch are displayed optically on this additional display panel.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
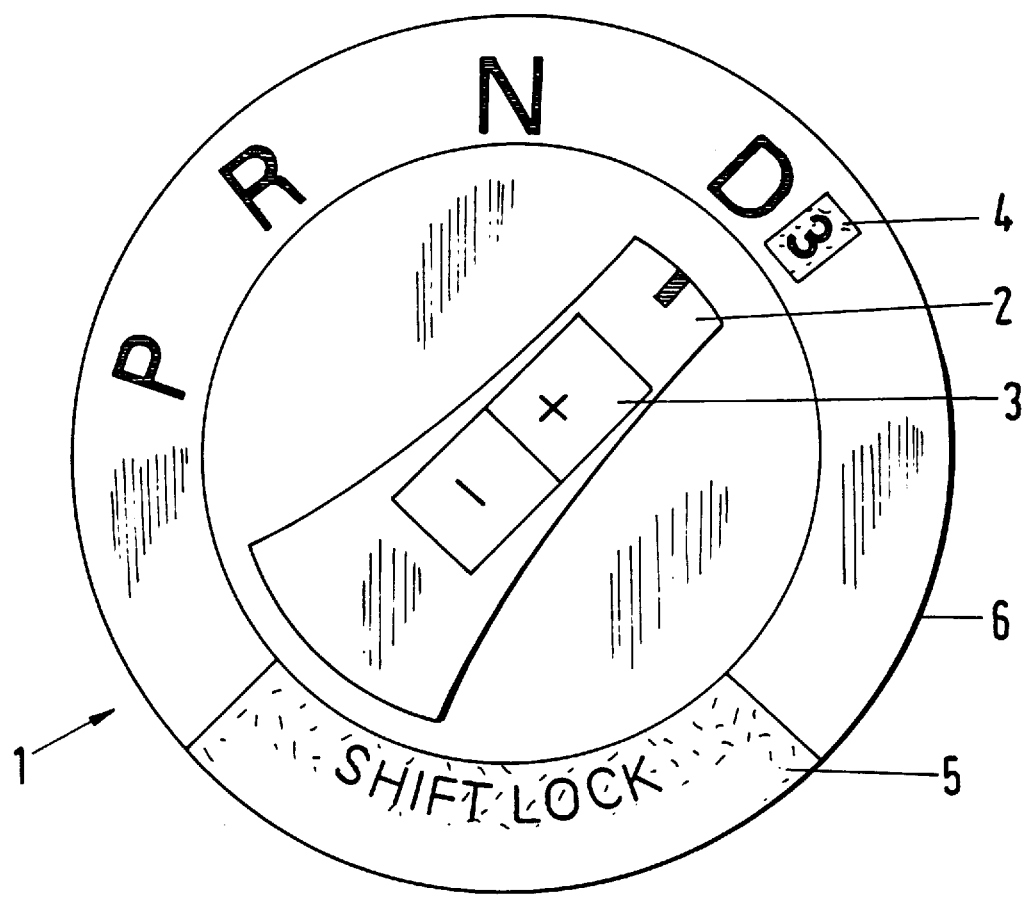
FIG. 1 is a plan view showing a representative drive gear selection device in accordance with a first embodiment of the invention.

In the typical embodiment of the invention illustrated in FIG. 1, a drive gear selection device 1 has a circular design and includes at its center a knob 2 for selecting the gear selection positions for the transmission conditions park (P), reverse (R), neutral (N) and forward travel (D). These selection positions for the drive gears are distributed approximately in an upper semicircle around the axis of rotation of the knob 2 in a display panel 6. In the exemplary embodiment shown here, the knob 2 includes a tipswitch 3. When the drive position D is selected by the knob 2, the tipswitch 3 may be activated to shift up or down into any of the individual forward gears D1, D2 and D3. Arranged at the right of the display panel next to selection position D for the forward drive condition, there is an additional display section 4 in which the selected forward gear D1, D2, D3, or the associated number 1, 2 or 3, is displayed as shown in FIG. 1.

Figure 2:
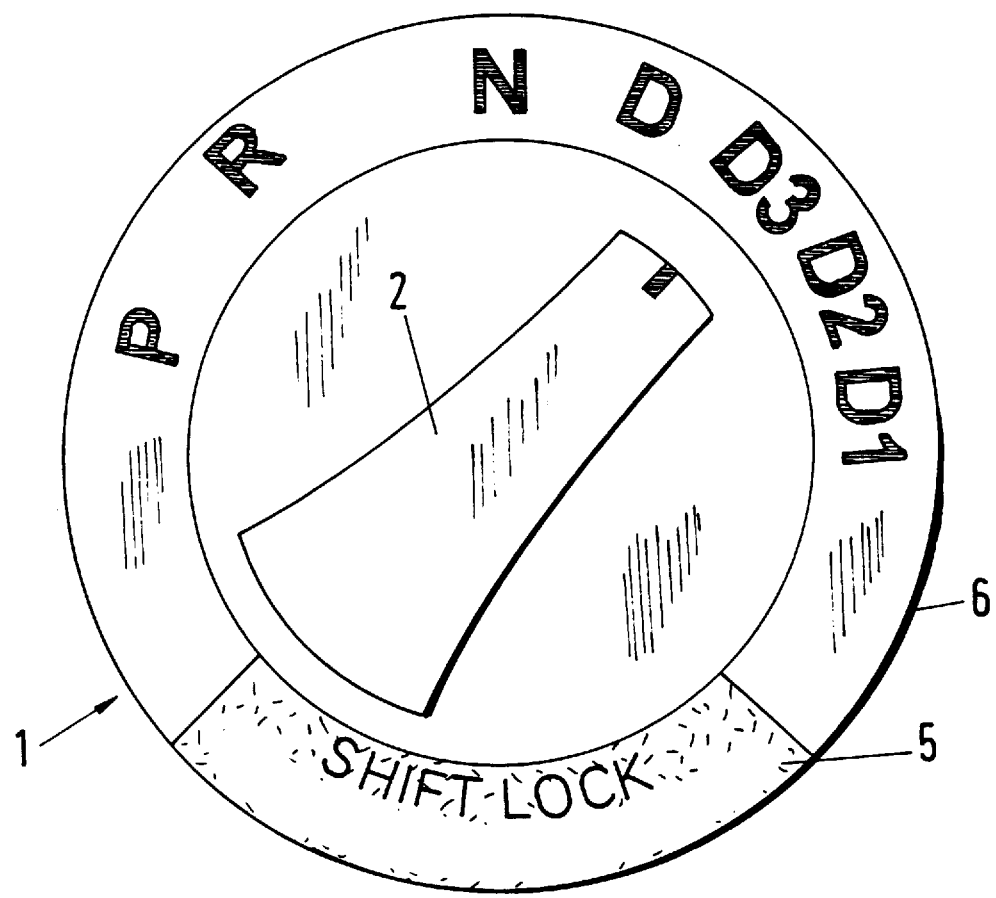
FIG. 2 is a plan view illustrating a representative drive gear selection device in accordance with a second embodiment of the invention.

In another typical embodiment, shown in FIG. 2, the individual forward drive gear display section 4 is omitted and the single knob position D is replaced by three knob positions D1, D2 and D3 which can be selected by rotation of the knob 2 about its axis. The tipswitch on the knob 2 is likewise omitted in this embodiment of the invention.

In both of the illustrated embodiments of the invention, an information section 5 is provided in a lower portion of the display panel 6, and various operating instructions or functional states of the transmission can be displayed for the driver in this section. As illustrated in the drawings, this display section can, for example, provide an instruction to operate the brake which is preferably lighted whenever the driver selects a forward or reverse gear drive position D or R. It is furthermore possible to illustrate other transmission-relevant information in the information section 5. Provision can preferably be made for the information section itself, or the letters or symbols displayed in it, to flash on and off.

Although the invention has been described herein with reference to specific embodiments, many modifications and variations therein will readily occur to those skilled in the art. Accordingly, all such variations and modifications are included within the intended scope of the invention.

We claim:

1. A drive gear selection arrangement for an automatic transmission comprising:

a rotatable selector knob for transmitting a control signal indicating a desired drive condition to a vehicle transmission;

a display panel for indicating a drive condition to be selected;

wherein the selector knob is centrally positioned in the display panel and wherein the selection positions of the drive condition of the transmission are arranged in a first portion of the display panel and a selectively activatable information section is provided in a second portion of the display panel and wherein the selector knob contains a momentary contact switch for selection or deselection of one of a plurality of forward drive gears of the transmission; and wherein the momentary control switch is a tipswitch.

2. A drive gear selection arrangement according to claim 1 wherein the information section can be activated to display an instruction for brake actuation with a drive condition R or D or to display letters or symbols which indicate the operating condition of the transmission.

3. A drive gear selection arrangement according to claim 2 wherein the information section or information displayed thereon can be displayed in a flashing manner.

4. A drive gear selection arrangement for an automatic transmission comprising:

a rotatable selector knob for transmitting a control signal indicating a desired drive condition to a vehicle transmission: and a display panel for indicating a drive condition to be selected;

wherein the selector knob is centrally positioned in the display panel and wherein the selection positions of the drive condition of the transmission are arranged in a first portion of the display panel and a selectively activatable information section is provided in a second portion of the display panel; and including a further selectively activatable display section positioned in the first portion of the display panel next to a selection position indicating a forward drive condition in which a selected forward gear can be displayed.

5. A drive gear selection arrangement according to claim 4 wherein the information section can be activated to display an instruction for brake actuation with a drive condition R or D or to display letters or symbols which indicate the operating condition of the transmission.

6. A drive gear selection arrangement according to claim 5 wherein the information section or information displayed thereon can be displayed in a flashing manner.

\* \* \* \* \*